(12) United States Patent
Rajagopal et al.

(10) Patent No.: US 7,748,037 B2
(45) Date of Patent: Jun. 29, 2010

(54) VALIDATING A MEMORY TYPE MODIFICATION ATTEMPT

(75) Inventors: Priya Rajagopal, Worcester, MA (US); Uday Savagaonkar, Beaverton, OR (US); David Durham, Beaverton, OR (US); Ravi Sahita, Beaverton, OR (US); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1315 days.

(21) Appl. No.: 11/233,733

(22) Filed: Sep. 22, 2005

(65) Prior Publication Data
US 2007/0079090 A1    Apr. 5, 2007

(51) Int. Cl.
    G06F 21/00    (2006.01)
(52) U.S. Cl. .................... 726/23; 726/22; 726/24; 726/25; 726/26; 713/164; 713/193; 713/194; 711/6; 711/163; 711/206
(58) Field of Classification Search ............. 726/22–27, 726/163; 711/163, 206, 6; 713/164, 193
    See application file for complete search history.

(56) References Cited

U.S. PATENT DOCUMENTS

| | | | | |
|---|---|---|---|---|
| 5,379,400 | A * | 1/1995 | Barakat et al. | 711/106 |
| 5,944,821 | A * | 8/1999 | Angelo | 726/22 |
| 5,966,531 | A * | 10/1999 | Skeen et al. | 719/315 |
| 6,101,586 | A * | 8/2000 | Ishimoto et al. | 711/163 |
| 6,105,137 | A * | 8/2000 | Graunke et al. | 726/24 |
| 6,658,515 | B1 * | 12/2003 | Larson et al. | 710/260 |
| 6,918,012 | B2 * | 7/2005 | Venkitakrishnan et al. | 711/145 |
| 7,093,295 | B1 | 8/2006 | Saito | |
| 7,496,727 | B1 * | 2/2009 | Ludloff et al. | 711/163 |
| 2003/0005272 | A1 | 1/2003 | Nalawadi et al. | |
| 2003/0217250 | A1 * | 11/2003 | Bennett et al. | 712/224 |
| 2003/0229794 | A1 | 12/2003 | Sutton, II et al. | |
| 2003/0235310 | A1 * | 12/2003 | Saito et al. | 380/281 |
| 2004/0039924 | A1 * | 2/2004 | Baldwin et al. | 713/189 |
| 2006/0085580 | A1 * | 4/2006 | Gupta et al. | 710/260 |
| 2007/0006191 | A1 * | 1/2007 | Franz et al. | 717/146 |

OTHER PUBLICATIONS

"International Preliminary Report on Patentability and Written Opinion", International Application No. PCT/US/2005/022577; Mailed Jan. 9, 2007, Whole Document.
"International Search Report", International Application No. PCT/US/2005/022577; Mailed Nov. 24, 2005, Whole Document.
USPTO, "First Office Action", U.S. Appl. No. 10/881,771, Mailed Sep. 5, 2007, Whole Document.

\* cited by examiner

Primary Examiner—Kambiz Zand
Assistant Examiner—Tongoc Tran
(74) Attorney, Agent, or Firm—Blakely, Sokoloff, Taylor & Zafman LLP (57) ABSTRACT

A system and process are described to enable at least one of a plurality of host agents executing on a system to update memory region types of a system memory, register the at least one host agent in a registry stored in system management memory, receive a system management interrupt (SMI) from one of the plurality of host agents to update a memory region type, determine if the host agent issuing the SMI is listed in the registry stored in system management memory, update the memory region in response to determining the host agent issuing the SMI is listed in the registry, and maintain the memory region type in response to determining the host agent issuing the SMI is not listed in the registry.

18 Claims, 4 Drawing Sheets

VALIDATING A MEMORY TYPE MODIFICATION ATTEMPT

CROSS-REFERENCE TO RELATED APPLICATION

The present application is related to pending U.S. patent application Ser. No. 10/881,777 entitled "SYSTEM AND METHOD FOR SECURE INTER-PLATFORM AND INTRA-PLATFORM COMMUNICATIONS," and assigned to the assignee of the present invention.

BACKGROUND

Processors such as Intel® Processors and others may be designed in general to allow data from memory to be cached by the processor. Additionally, accesses to data in memory may require one or more actions to be taken with regard to the contents of caching structures in the system processor or processors. These actions are referred to herein as snooping characteristics. Furthermore, certain processors may select to allow dynamic reordering of memory accesses. The type of caching, if any (cacheability) used by the processor to access a location in memory, the snooping characteristics and whether dynamic reordering of memory accesses is enabled for that location determines certain behaviors of the memory location, such as for example whether the memory location supports ordering operations or side-effects of reads correctly. These attributes and others that relate to memory behavior are called a memory type and may be specified for a given memory location and access event using a variety of system flags and registers. Memory types may include, for example, "uncacheable", "write combining", "write through", "write back", and "write protect". Memory type range registers (MTRRs), a page attribute table, page tables and other processor control register fields may determine, for each memory access, the relevant memory type for the linear or physical address being accessed. The communication protocols utilized by a processor may vary depending on the memory type of the memory location being accessed.

Any system software or program executing in a privileged mode may read and modify the memory types specified by these processor control registers, including the MTRRs, and thus change the memory types for ranges of system memory, using instructions such as RDMSR (read model specific register) and WRMSR (write model specific register) in relevant IA-32 architectures (*IA-32 Intel Architecture Software Developer's Manual, vol.* 3). This in turn may allow malware, or undesirable software such as worms, viruses, Trojans, etc. running in privileged mode to launch cache based attacks on critical data or code segments of memory. For example, modifying the caching behavior for a range of memory locations from write-through to write-back can lead to unpredictable and possibly harmful system behavior, and can be exploited by malware to alter the code and data segments of a system or user process via a cache-based attack. Such modifications are unlikely to be detectable by any chipset based memory protection method that merely monitors accesses to memory because such monitoring cannot detect cache-based attacks wherein modifications that are done entirely within the cache. Many other such memory typing related attacks are possible that may range in their effect from merely impacting performance to unauthorized access to, or actual corruption of code or data. While such attacks are theoretically preventable by means such as preventing all modification of MTRRs, after system boot, or by forcing a cache flush each time a privileged process relinquishes a processor, such a solution may impose unacceptable limitations on flexibility or performance.

Processors such as Intel Processors and others may support a system management (SM) mode (SMM). A processor operating in SMM provides a special-purpose, alternate operating environment that can be used to monitor and manage various system-wide functions such as managing system resources for more efficient energy usage, to control system hardware, or to run specialized code outside the control of the normal operating environment such as the operating system.

When SMM is invoked, often through a system management interrupt (SMI), the processor switches to the separate operating environment and executes handler code to perform system management operations. Generally, code and data related to system management mode reside in a special chipset or BIOS-protected area of memory that is inaccessible to processes such as the operating system when the system is executing in a non-SM mode, termed system management random access memory (SMRAM) in the IA-32 architecture. When the SMI handler has completed its operations, it resumes executing the interrupted application or operating-system program or task.

DETAILED DESCRIPTION

A processor may have one or more caches as is known in the art. In one embodiment a processor may be able to specify the type of caching to be associated with a specific memory location in its physical memory, or may prohibit caching of that memory location. These attributes are generally termed cacheability. Furthermore, a processor may permit or disable of the dynamic reordering of memory accesses. This may be termed memory ordering. A general term for the properties of a memory location relevant to a process executing on a processor that may depend on its cacheability, snooping characteristics, communication protocols and on its memory ordering properties, among other factors, is the memory type of the memory location.

TABLE 1

Memory types in an IA-32 embodiment

| Memory Type and Mnemonic | Cacheable | Writeback Cacheable | Allows Speculative Reads | Memory Ordering Model |
|---|---|---|---|---|
| Strong Uncacheable (UC) | No | No | No | Strong Ordering |
| Uncacheable (UC-) | No | No | No | Strong Ordering |

TABLE 1-continued

Memory types in an IA-32 embodiment

| Memory Type and Mnemonic | Cacheable | Writeback Cacheable | Allows Speculative Reads | Memory Ordering Model |
|---|---|---|---|---|
| Write Combining (WC) | No | No | Yes | Weak Ordering |
| Write Through (WT) | Yes | No | Yes | Speculative Processor Ordering |
| Write Back (WB) | Yes | Yes | Yes | Speculative Processor Ordering |
| Write Protected (WP) | Yes for reads; No for writes | No | Yes | Speculative Processor Ordering |

Table 1 depicts memory types in one embodiment, the IA-32 architecture, and their properties as described in the IA-32 documentation (*IA-32 Intel Architecture Software Developer's Manual, Vol. 3: System Programming Guide, Ch. 10.*). As seen in Table 1, the specific memory type for a location in memory specifies the cacheability and writeback cacheability of the data at the location, and whether speculative reading is allowed for the memory location accessed. The memory type for a location may thus determine a memory ordering model that may be assumed by a program using the memory. Certain memory types are required or desirable for certain operations. For example, memory reads with side effects or memory mapped I/O operations must be performed on memory of an uncacheable type (UC or UC-in the table above); in another instance, write-combining (WC) memory is often used for the implementation of video frame buffers for efficiency reasons. Further details of memory types in IA-32 may be found in the documentation. Other processor architectures may have different supported memory types. For example, in an embodiment, the ordering characteristics of memory accesses (e.g., strongly ordered, weakly ordered, processor ordered) or the snooping characteristics (e.g., snooped, self-snooped, unsnooped) may be specified. Discussion herein of the specific elements of the IA-32 memory type support in no way limits the scope of the invention.

Figure 1:
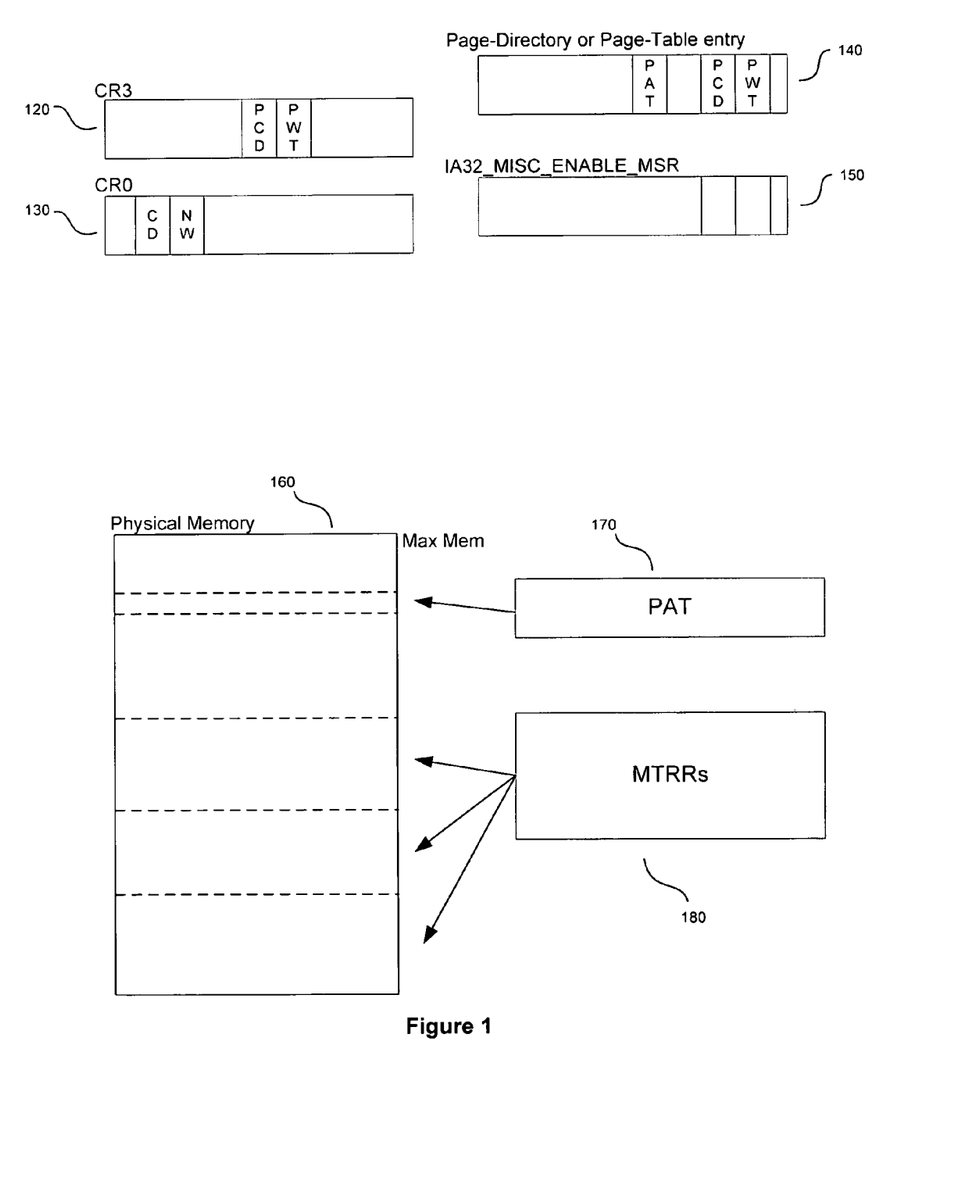
FIG. 1 depicts a memory type determination overview in one embodiment.

FIG. 1 depicts memory type specification in an IA-32 embodiment. In the IA-32 embodiment, a hierarchy of cache control flags, registers, and tables operate to specify a memory type. While the details of these may be found in the IA-32 documentation, a brief overview is presented here to clarify the subject matter of this paper. IA-32 control registers CR0 130, and CR3 120 in certain IA-32 processors may each include a field, or fields (a specified range or ranges of bits), affecting memory type determination. For example, the global flags CD and NW in CR0 130 control overall caching. CR3 120 has flags PCD and PWT which control page directory caching. Other bits in the IA32_MISC_ENABLE_MSR register 150 may enable or disable the L3 cache of an IA-32 processor, if it is present.

Furthermore, as discussed above, paging in the IA-32 and other architectures is controlled at least in part by a page table in the processor, and the page-directory entry (PDE) or page-table entry (PTE) 140 referencing a page may contain fields affecting the memory type of the page, including PCD and PWT flags and the page access table bit (PAT) 170, among others. Finally, the PAT model specific register (MSR) 170 and the memory type range registers (MTRRs) 180 control caching of paged memory and of ranges of physical memory respectively, and thus determine the memory types of those locations in physical memory.

A process to determine the memory type of a specific access based on the values of one or more of the above register fields and table entries is specified in the IA-32 documentation.

In general, it should be appreciated that the above description of memory typing is only an example of one embodiment. Many other embodiments of memory typing exist and are implemented and others may readily be visualized and designed by one in the art. For instance, a particular architecture may support more or fewer than the six memory types defined in Table 1. Other architectures may support more memory types including specific types based, for example, on level of caching, that are not supported in IA-32. Furthermore, the artisan may readily discern that a plethora of schemes for the specification of memory type by a processor for a memory location may be designed and implemented. Such schemes may or may not use a multiplicity of registers and register fields as are used in IA-32. In some instances fewer, or no, control registers may be used. In others memory type may be determined entirely from table-like structures maintained in the processor, or in memory, akin to the PAT or the MTRRs or both. Many other mechanisms for specifying and determining memory type are possible.

Figure 2:
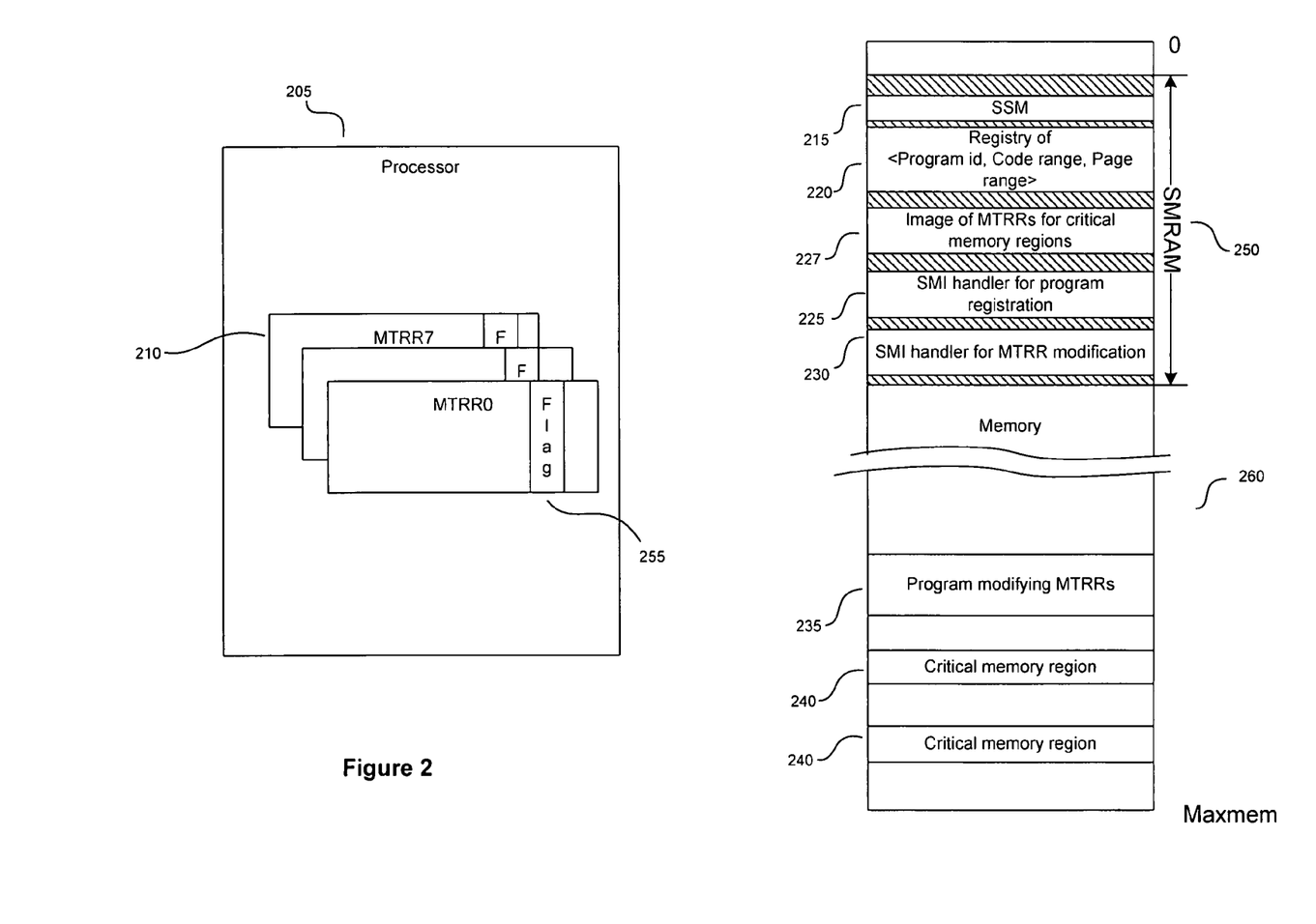
FIG. 2 depicts the organization of one embodiment at a block level.

FIG. 2 depicts one embodiment, including a processor 205 and a memory 260 ranging from locations 0 to Maxmem. The processor in this embodiment is an IA-32 processor that supports memory typing. In particular, the processor includes a set of memory type range registers or MTRRs 210 as previously described, among other registers and fields, to specify and control memory types for ranges of system memory.

In addition, the processor also supports a system management mode (SMM). When SMM is invoked through a system management interrupt (SMI), the processor saves the current state of the processor (the processor's context), then switches to a separate operating environment contained in system management RAM (SMRAM) 250. While in SMM, the processor may execute SMI handler code such as handlers 225 and 230 which also reside in SMRAM 250, to perform operations such as powering down unused disk drives or monitors, executing proprietary code, or placing the whole system in a suspended state. When the SMI handler has completed its operations, it executes a resume (RSM) instruction. This instruction causes the processor to reload the saved context of the processor, switch back to protected or real mode, and resume executing the interrupted application or operating-system program or task.

The following SMM mechanisms make it transparent to applications programs and operating systems:

The only way to enter SMM is by means of an SMI.

The processor executes SMM code in a separate address space (SMRAM) that can be made inaccessible from the other operating modes.

Upon entering SMM, the processor saves the context of the interrupted program or task to a saved state map (SSM) 215 in SMRAM.

All interrupts normally handled by the operating system are disabled upon entry into SMM.

The RSM instruction can be executed only in SMM.

Detailed description of the SMM mode in general may be found in the IA-32 documentation (*IA-32 Intel Architecture Software Developer's Manual, Vol. 3: System Programming Guide, Ch.* 13).

Of course, as will be appreciated by one of ordinary skill in the art, many variations on the above described example of system management in the IA-32 case are possible. For example, in other cases, the specific operations that trigger a system management event may differ. Furthermore, processors may have modes that differ from the set of modes in which an IA-32 processor implementing SMM may operate. The terms interrupt and resume are used here, but similar concepts may be expressed in other terminology, for example, a transfer of control to management mode may be termed a trap; and a resume may also be called a return or exit. The locations of objects in memory depicted in FIG. 2 are merely illustrative. In other embodiments, the relative locations of the various components of the system management memory partition may differ. The location of the system management memory partition itself may vary relative to other objects in the system memory viewed as a whole. For example, in the figure, the base of SMRAM 250 is shown at a lower memory location than that of the program 235 seeking to modify memory type In other embodiments, it may be at a higher location. Of course, the sizes of the blocks of memory drawn in figure two are not intended to be to any scale, but are merely illustrative. A program may have two or more critical memory regions, or may not have any. Many other variations are possible.

As the figure further illustrates, the SMM mode and other components of this embodiment may be used to protect undesired memory type modification.

A program 235 executing in privileged mode may be registered in a registry 220 that includes, for example its process id, and a code and memory page range for the program. Generally, the program 235 is a kernel mode or privileged operating system code executing at the highest level of privilege available, and therefore able to modify the MTRRs or other registers relating to memory type specification. In this embodiment, a special SMM registration handler 225 is provided. A call or generated interrupt to the registration handler 225 may be used to register the program. The handler and the registry are stored in the system management memory (SMRAM) 250. Additionally, a shadow copy of the MTRRs obtained at boot may also be preserved in SMRAM at 227. A special SMM mode agent or SMI handler for interrupts or operation notifications generated by attempted modification of the MTRRs is also part of SMRAM at 230. This handler operates to service such interrupts and to validate that the interrupting process such as the one at 235, is properly registered in the registry 220 and that the memory locations in critical memory regions 240 that it may seek to affect by modifications to the MTRRs 210 are within the memory range registered by the process.

In this embodiment, a special flag or bit is provided in the MTRRs at 255. This flag may be used by the SMM handler 230 to indicate whether an attempt to modify memory type information in the processor, such as by modifying the MTRRs, was made by a registered process (the registrant); and whether the attempted instruction specified the registrant's own memory ranges. For example, the bit may be set if and only if a memory type change request was attempted by an unregistered program or driver. To ensure that the bit or flag is resistant to tampering, an instruction to modify the bit may be restricted by the processor to SMM mode only, thus ensuring that only trusted SMM handlers set or reset the flag bit. In some embodiments, the SMM handler may not take any further action, leaving it to other privileged mode drivers or programs to check the flag before proceeding. This provides flexibility in that the other drivers may then choose different courses of action depending on their criticality and other design parameters of the system.

Figure 3A:
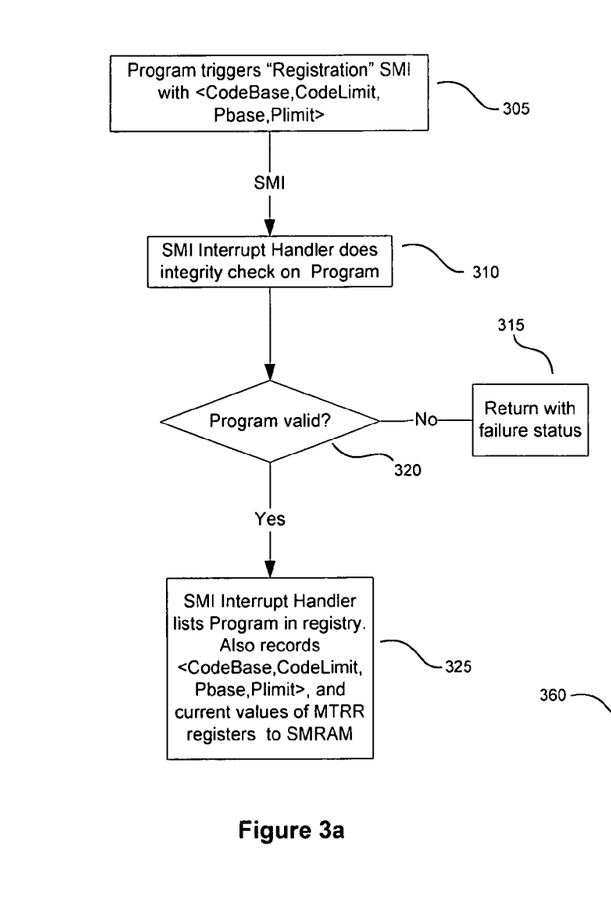
FIG. 3 depicts processing in one embodiment.
Figure 3B:
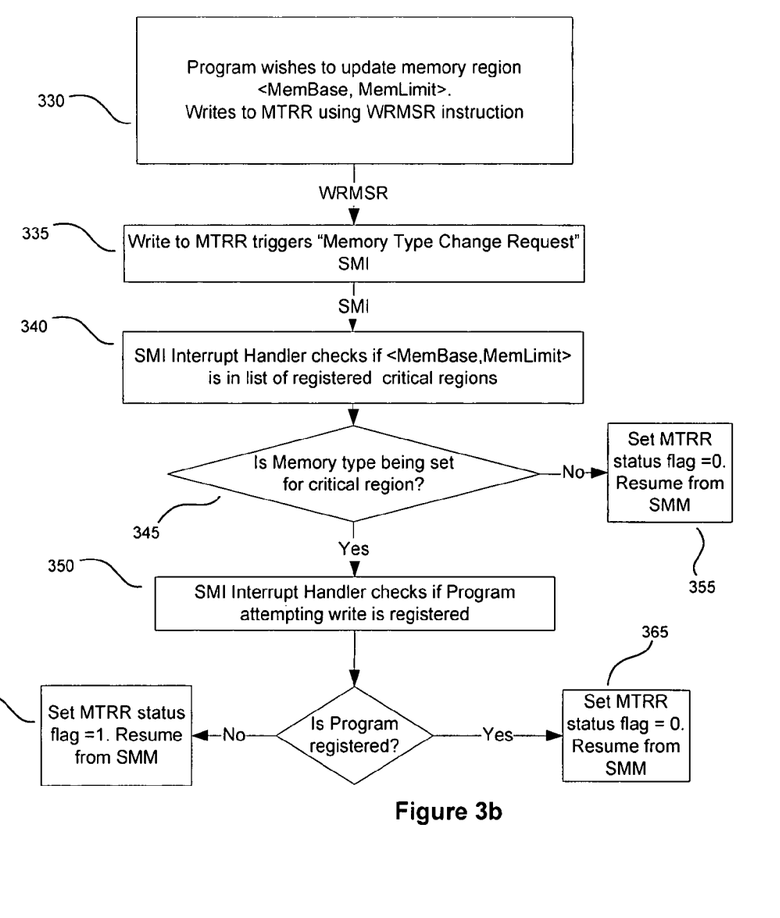

A more detailed view of the processing outlined with reference to FIG. 2 is provided in FIGS. 3*a* and 3*b*. FIG. 3*a* depicts a phase of processing in one embodiment where a program that includes critical memory regions registers with a special SMI handler and is included in a registry in system management memory after validation by the SMI handler. FIG. 3*b* depicts processing that occurs when a program such as a kernel level driver or other privileged process wishes to access a critical memory region. Turning first to FIG. 3*a*, a program initiates registration 305 by triggering a SMI for that purpose. It may provide a set of parameters to the handler, including ranges for critical memory regions that it has allocated and will access. The SMI handler then may first check to see if the driver or privileged program is valid, 320. This may be done in a variety of ways, in particular, by direct measurement of the code and or measurement of another invariant corresponding to the driver and verifying the measurement against a configured previously determined list of images that are known to be good. Because the SMI handler at 310 has access to the context of the program seeking registration and all of the memory in use by the operating system, it is able to inspect the code of the registering program and measure it, for example, by running a hash function on the code and comparing the hash value so obtained to a previously determined good value. If the test of validity, however conducted, fails, the registration handler may return with an error 315. If the program is valid, the handler in the embodiment will store an entry in a table or other data structure to record the registration at 325. The stored values generally will include the process identifier, the code base address and limit address that specify the locations at which the registrant program is stored, and the current values of the MTRRs which refer to memory ranges that overlap the critical memory ranges associated with the registering program, in addition to the memory page range that is being passed with the registering process.

Next, in FIG. 3*b*, the process that occurs when a program attempts to read or modify memory type is depicted. In this embodiment a second special SMI handler (in addition to the registration handler discussed above) is provided that responds to the attempt to execute specific instructions that involve the MTRRs. This handler may be invoked as a side-effect of an attempt to execute a WRMSR or RDMSR instruction with a MTRR such as at 330. This attempt triggers an SMI, 335 which transfers control to an SMI handler 340. First, the handler determines if the range of memory affected by the modified MTRR would overlap any previously registered ranges of critical memory, 345. If that is not the case, the handler exits and returns control to the program that caused the interrupt at 355. On the other hand, if the affected memory range includes a previously registered critical region of memory, the SMI handler in this embodiment refers to the registry created by the process previously described to ensure that the program seeking to modify memory is validly registered, 350. If the program is registered, the status flag in the MTRR reserved for indication of suspicious accesses to the MTRRs is cleared, 365. Otherwise, it is set, 360, and the system resumes in either case. To perform the test at 350, the SMI handler uses the processor context information that is saved as a side effect of the interrupt mechanism. In this embodiment, the handler compares the location of the interrupting instruction, available from the interrupting program's context, to the code location ranges specified for registered programs in the registry. This yields the identity of the process, and it may then also be determined if the program is attempting to access its own critical memory regions, based on other information associated with that program in the registry.

Many variations of the above described embodiment are possible. The processing described above takes place in an embodiment based on IA-32 concepts and functionality. However, other embodiments are possible in other architectures that have similar or equivalent functionality. Specifically, in other embodiments, memory type management may be performed by means other than the use of MTRRs, and the SMI interrupt following an attempt to modify memory type may be generated by the modification of other registers or other fields in memory. In some embodiments more information about a registrant program may be stored, in others, less. For example, the process ID may or may not be stored. In some embodiments, the integrity check performed on the program may vary, or be omitted. In others, the validity of an attempt to modify memory type may be checked regardless of whether a critical memory range was being affected. The actions taken on finding an invalid program or an unregistered program may vary. In some embodiments, an error message, halt, or kernel panic may be generated. In others, a warning may be logged.

Many different data structures and algorithmic flows may be used in embodiments. Storage of the MTRRs and registry in SMRAM may take a wide variety of forms as is known in the art. The actual processing in embodiments may differ accordingly.

Some embodiments may include virtualization systems. Virtualization is a technique that enables a processor based host machine with support for virtualization in hardware and software, or in some cases, in software only, to present an abstraction of the host, such that the underlying hardware of the host machine appears as one or more independently operating virtual machines. Each virtual machine may therefore function as a self-contained platform. Often, virtualization technology is used to allow multiple guest operating systems and/or other guest software to coexist and execute apparently simultaneously and apparently independently on multiple virtual machines while actually physically executing on the same hardware platform. A virtual machine may mimic the hardware of the host machine or alternatively present a different hardware abstraction altogether.

Virtualization systems provide guest software operating in a virtual machine with a set of resources (e.g., processors, memory, IO devices) and may map some or all of the components of a physical host machine into the virtual machine, or create fully virtual components. The virtualization system may thus be said to provide a virtual bare machine interface to guest software. In some embodiments, virtualization systems may include a virtual machine monitor (VMM) which controls the host machine. The VMM provides guest software operating in a virtual machine (VM) with a set of resources such as processors, memory, and IO devices. The VMM may map some or all of the components of a physical host machine into the virtual machine, and may create fully virtual components, emulated in software in the VMM, which are included in the virtual machine (e.g., virtual IO devices). The VMM uses facilities in a hardware virtualization architecture to provide services to a virtual machine and to provide protection from and between multiple virtual machines executing on the host machine. Generally, the memory space in which the VMM operates is a part of host physical memory that is not accessible to any of the virtual machines that are serviced by the VMM.

Figure 4:
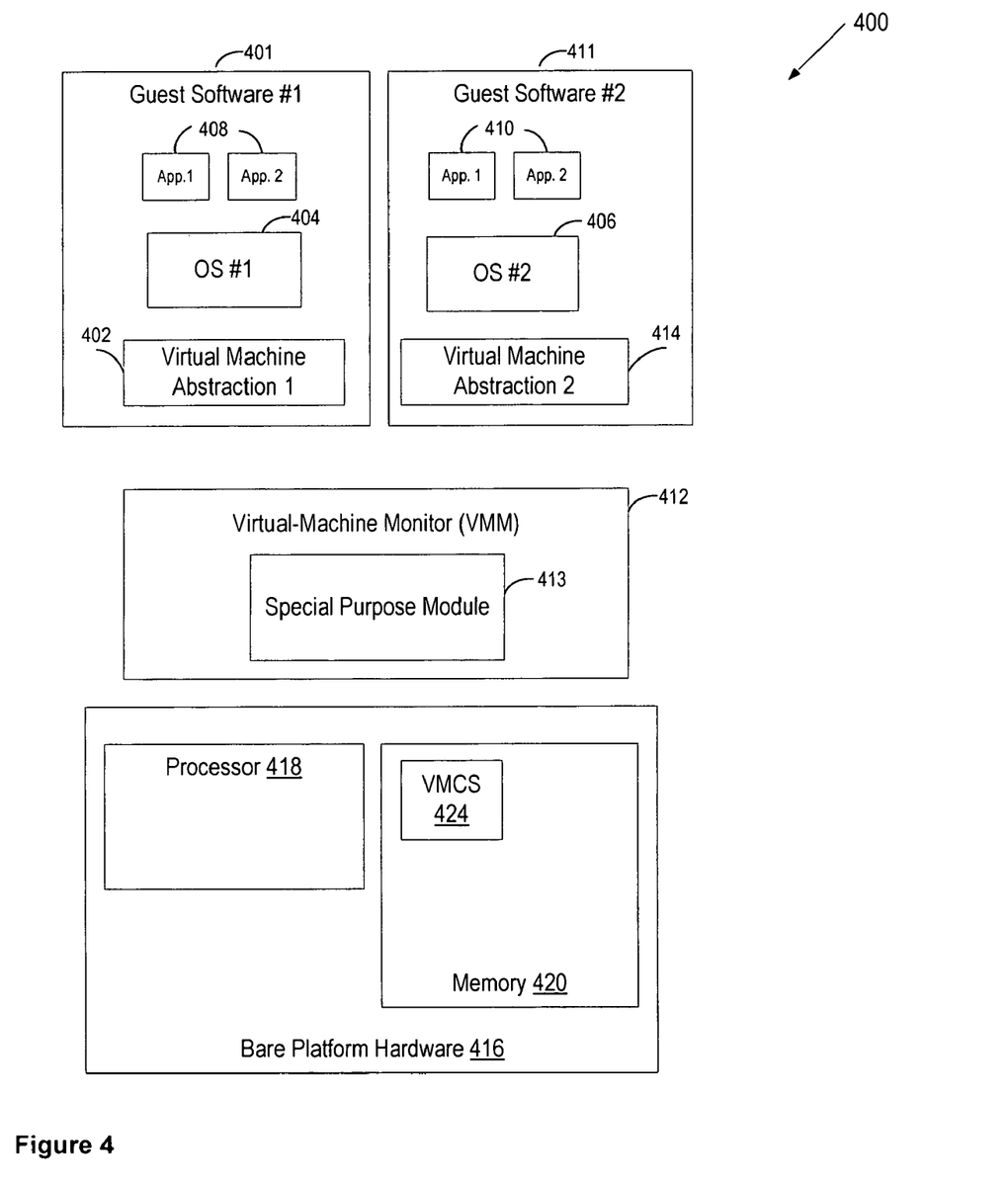
FIG. 4 depicts a virtualization environment in one embodiment

FIG. 4 illustrates one embodiment of a virtual-machine environment 400. In this embodiment, a processor-based platform 416 may execute a VMM 412. The VMM, though typically implemented in software, may emulate and export a virtual bare machine interface to higher level software. Such higher level software may comprise a standard OS, a real time OS, or may be a stripped-down environment with limited operating system functionality and may not include OS facilities typically available in a standard OS in some embodiments. Alternatively, for example, the VMM 412 may be run within, or using the services of, another VMM. VMMs may be implemented, for example, in hardware, software, firmware or by a combination of various techniques in some embodiments.

The platform hardware 416 may be a personal computer (PC), mainframe, handheld device such as a personal digital assistant (PDA) or "smart" mobile phone, portable computer, set top box, or another processor-based system. The platform hardware 416 includes at least a processor 418 and memory 420. Processor 418 may be any type of processor capable of executing programs, such as a microprocessor, digital signal processor, microcontroller, or the like. The processor may include microcode, programmable logic or hard coded logic for execution in embodiments. Although FIG. 4 shows only one such processor 418, there may be one or more processors in the system in an embodiment. Additionally, processor 418 may include multiple cores, support for multiple threads, or the like. Memory 420 can comprise a hard disk, a floppy disk, random access memory (RAM), which may be, for example, Dynamic RAM (DRAM), Synchronous DRAM (SDRAM), or one of many other types of RAM, read only memory (ROM), flash memory, any combination of the above devices, or any other type of machine medium readable by processor 418 in various embodiments. Memory 420 may store instructions and/or data for performing program execution and other method embodiments.

The VMM 412 presents to guest software an abstraction of one or more virtual machines, which may provide the same or different abstractions to the various guests. FIG. 4 shows two virtual machines, 402 and 414. Guest software such as guest software 401 and 411 running on each virtual machine may include a guest OS such as a guest OS 404 or 406 and various guest software applications 408 and 410. Guest software 401 and 411 may access physical resources (e.g., processor registers, memory and I/O devices) within the virtual machines on which the guest software 401 and 411 is running and to perform other functions. For example, the guest software 401 and 411 expects to have access to all registers, caches, structures, I/O devices, memory and the like, according to the architecture of the processor and platform presented in the virtual machine 402 and 414.

In one embodiment, the processor 418 controls the operation of the virtual machines 402 and 414 in accordance with data stored in a virtual machine control structure (VMCS) 424. The VMCS 424 is a structure that may contain state of guest software 401 and 411, state of the VMM 412, execution control information indicating how the VMM 412 wishes to control operation of guest software 401 and 411, information controlling transitions between the VMM 412 and a virtual machine, etc. The processor 418 reads information from the VMCS 424 to determine the execution environment of the virtual machine and to constrain its behavior. In one embodiment, the VMCS 424 is stored in memory 420. In some embodiments, multiple VMCS structures are used to support multiple virtual machines.

Resources that can be accessed by guest software (e.g., 401, including guest OS 404 and application 408) may either be classified as "privileged" or "non-privileged." For privileged resources, the VMM 412 facilitates functionality desired by guest software while retaining ultimate control over these privileged resources. Further, each guest software 401 and 411 expects to handle various platform events such as exceptions (e.g., page faults, general protection faults, etc.), interrupts (e.g., hardware interrupts, software interrupts), and platform events (e.g., initialization (INIT) and system management interrupts (SMIs)). Some of these platform events are "privileged" because they must be handled by the VMM 412 to ensure proper operation of virtual machines 402 and 414 and for protection from and among guest software. Both guest operating system and guest applications may attempt to access privileged resources and both may cause or experience privileged events. Privileged platform events and access attempts to privileged resources are collectively referred to as "privileged events" or "virtualization events" herein.

In some embodiments a mode similar to the system management mode described above may be implemented as a special purpose module 413 within VMM 412. Just as the SMM may perform system management tasks for a host, the VMM may perform system management tasks for a virtual host or virtual machine such as 401. This is because, just as with the SMM, a special interrupt generated by a virtualization event in a guest such as 401 or 411 may invoke the VMM, which then operates in a region of memory that is inaccessible to the guest software executing in the VMs 402 and 414. Furthermore, the VMM has special access to the memory used by guest processes and may inspect and modify it. Just as in the SMM mode, the system state of a VM is saved on entry to the VMM or VMEXIT. While running the VMM, the processor may execute special handlers just as in the SMM mode, which reside in a portion of memory that is inaccessible to the guest processes running in the VMs. In a manner similar to the RSM instruction in the SMM mode, the VMENTER instruction causes a return to normal processing in the guest after the VMM has completed its operations.

Thus the embodiments described with reference to the SMM as in the descriptions of FIGS. 2, 3a and 3b above may be analogously alternatively implemented in a VMM. In one embodiment, the entirety of the functionality of SMM may alternatively be provided as part of the special module 413, and all of the actions described above occur in this alternative implementation of an SMM.

In other embodiments, only the functionality related to protecting the memory type specification system described above may be implemented within a VMM. Just as in the case of the SMM based implementation, a guest executing in a VM may register by creating a virtualization event, triggering a VMEXIT to activate an agent within the VMM, passing the same parameters as earlier described with reference to FIG. 3a. As before, the agent may perform processing to register the guest, including performing an integrity check on the guest and validation of the guest, storing MTRR and other parameters as described above with reference to FIG. 3a and then allow the guest to resume by executing a VMENTER.

Furthermore, in a manner analogous to that depicted in FIG. 3b, a guest may trigger another virtualization event to request access to the MTRRs. As described with reference to FIG. 3b for an SMI handler, the handler in the VMM may analogously check if the range of memory specified by the guest is in the list of registered critical regions, and if so, then verify the integrity of the MTRRs against the previously stored shadow copy, validate the requesting guest program against the registry, set a flag depending on whether the requestor is a registered program, and return control to the guest after access is complete and the critical regions are protected again with a VMEXIT.

As before many variations of the embodiments based on a VMM are possible. The virtual machines shown in FIG. 4 are only one representation of one embodiment, in other embodiments, the actual number of virtual machines executing on a host machine may vary from one to many. Portions of the VMM and the VMCS may be implemented in hardware or in software to different extents in different embodiments. The basic functions provided by the VMM may vary in some embodiments. Each embodiment may define a different set of virtualization events. As previously indicated, the processing described above takes place in an embodiment based on IA-32 concepts and functionality. However, other embodiments are possible in other architectures that have similar or equivalent functionality. In some embodiments more information about a registrant program may be stored in a registry, in others, less. For example, the process ID may or may not be stored. Many different data structures and algorithmic flows may be used in embodiments. Storage of the registers and registry in VMM dedicated memory may take a wide variety of forms as is known in the art. The actual processing in embodiments may differ accordingly. The terms "registry" and "registration" used in describing data stored relating to validated or registered processes in embodiments herein may not necessarily be used in other descriptions of other embodiments, instead, other more generic terms may be used such as "table," "list," "shortlist," etc. for registry and "enlistment," "enrollment," etc. for registration without departing from the spirit and concept of the embodiments described herein. In some embodiments, the integrity check performed on the program may vary, or be omitted. In some embodiments, the memory access controller may not be present and only the remaining actions may be performed. The actions taken on finding an invalid program or an unregistered program may vary. In some embodiments, an error message, halt, or kernel panic may be generated. In others, a warning may be logged.

In the preceding description, for purposes of explanation, numerous specific details are set forth in order to provide a thorough understanding of the described embodiments, however, one skilled in the art will appreciate that many other embodiments may be practiced without these specific details.

Some portions of the detailed description above are presented in terms of algorithms and symbolic representations of operations on data bits within a processor-based system. These algorithmic descriptions and representations are the means used by those skilled in the art to most effectively convey the substance of their work to others in the art. The operations are those requiring physical manipulations of physical quantities. These quantities may take the form of electrical, magnetic, optical or other physical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

In the description of the embodiments, reference may be made to accompanying drawings. In the drawings, like numerals describe substantially similar components throughout the several views. Other embodiments may be utilized and structural, logical, and electrical changes may be made. Moreover, it is to be understood that the various embodiments, although different, are not necessarily mutually exclusive. For example, a particular feature, structure, or characteristic described in one embodiment may be included within other embodiments.

Further, a design of an embodiment that is implemented in a processor may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) that constitute or represent an embodiment.

Embodiments may be provided as a program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments may also be downloaded as a program product, wherein the program may be transferred from a remote data source to a requesting device by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the claimed subject matter but to illustrate it. The scope of the claimed subject matter is not to be determined by the specific examples provided above but only by the claims below.

What is claimed is:

1. A computer-implemented method comprising:
   enabling at least one of a plurality of programs to update a memory type of a memory region, the plurality of programs to be executed in privilege mode on a computer, the memory type to indicate a type of caching to be associated with the memory region;
   registering the at least one program in a registry stored in a system management memory;
   receiving a system management interrupt (SMI) indicating a program is attempting to execute an instruction to update a memory type of a memory region;
   determining if the program attempting to execute the instruction is registered in the registry stored in system management memory;
   updating the memory type of the memory region in response to determining the program attempting to execute the instruction is registered in the registry; and
   maintaining the memory type of the memory region in response to determining the program attempting to execute the instruction is not registered in the registry.

2. The method of claim 1 wherein:
   the program attempting to execute the instruction is executed via a virtual machine;
   the SMI is a virtualization event; and
   the registry is included in a virtual machine monitor.

3. The method of claim 1 wherein registering the at least one program in the registry includes storing, in the registry, a range of memory locations in association with the program, and wherein determining if the program attempting to execute the instruction is registered in the registry further includes determining if the instruction was to update a memory region listed in the registry as associated with the program attempting to execute the instruction.

4. The method of claim 1, wherein the memory type corresponds to a memory attribute.

5. The method of claim 4, the memory attribute to indicate at least one of
   whether the memory is cacheable,
   whether the memory is writeback cacheable,
   whether the memory allows for speculative reads, and
   a memory ordering property of a memory ordering model.

6. The method of claim 1, wherein the memory type comprises a value indicating the memory region is at least one of strong uncacheable, uncacheable, write-combining write-through, write-back, and write-protected.

7. A machine readable storage medium having stored thereon a data that when accessed by a machine causes the machine to perform instructions comprising:
   enabling at least one of a plurality of programs to update a memory type of a memory region, the plurality of programs to be executed in privilege mode on a computer, the memory type to indicate a type of caching to be associated with the memory region;
   registering the at least one program in a registry stored in a system management memory;

receiving a system management interrupt (SMI) indicating a program is attempting to execute an instruction to update a memory type of a memory region;

determining if the program attempting to execute the instruction is registered in the registry stored in system management memory;

updating the memory type of the memory region in response to determining the program attempting to execute the instruction is registered in the registry; and maintaining the memory type of the memory region in response to determining the program attempting to execute the instruction is not registered in the registry.

8. The machine readable storage medium of claim 7 wherein:

the program attempting to execute the instruction is executed via a virtual machine;

the SMI is a virtualization event; and the registry is included in a virtual machine monitor.

9. The machine readable storage medium of claim 7, wherein registering the at least one program in the registry includes storing, in the registry, a range of memory locations in association with the program, and wherein determining if the program attempting to execute the instruction is registered in the registry further includes determining if the instruction was to update a memory region listed in the registry as associated with the program attempting to execute the instruction.

10. The machine readable storage medium of claim 7, wherein the memory type corresponds to a memory attribute.

11. The machine readable storage medium of claim 10, the memory attribute to indicate at least one of whether the memory is cacheable, whether the memory is writeback cacheable, whether the memory allows for speculative reads, and a memory ordering property of a memory ordering model.

12. The machine readable storage medium of claim 7, wherein the memory type comprises a value indicating the memory region is at least one of strong uncacheable, uncacheable, write-combining write-through, write-back, and write-protected.

13. A system comprising a processor including a plurality of memory type range registers, each memory type range register to indicate a type of caching to be associated with a corresponding memory region;

a memory including a plurality of memory regions, wherein each memory region corresponds to one of the plurality of memory type range registers, and a registry to identify at least one program enabled to update one of the memory type range registers; and a system management memory (SMM) to include the registry and a system management interrupt (SMI) handler, the SMI handler to receive an SMI indicating a program is attempting to execute an instruction to update one of the memory type range registers, determine if the program attempting to execute the instruction is registered in the registry stored in system management memory, update the memory type range register in response to determining the program attempting to execute the instruction is registered in the registry, and maintain the memory type range register in response to determining the program attempting to execute the instruction is not registered in the registry.

14. The system of claim 13 wherein the program attempting to execute the instruction is executed via a virtual machine, the SMI is a virtualization event; and the SMM includes a virtual machine monitor memory further including the registry.

15. The system of claim 13, wherein the registry further includes a range of memory locations in association with the at least one program, and wherein determining if the program attempting to execute the instruction is registered in the registry further includes determining if the instruction was to update a memory location listed in the registry as associated with the program attempting to execute the instruction.

16. The system of claim 13, wherein each of the plurality the memory type range registers corresponds to a memory attribute.

17. The method system of claim 16, wherein the memory attribute comprises at least one of whether the memory is cacheable, whether the memory is writeback cacheable, whether the memory allows for speculative reads, and a memory ordering property of a memory ordering model.

18. The system of claim 13, wherein each of the plurality the memory type range registers includes a value corresponding to a memory region type comprising at least one of strong uncacheable, uncacheable, write-combining write-through, write-back, and write-protected.

* * * * *

UNITED STATES PATENT AND TRADEMARK OFFICE
CERTIFICATE OF CORRECTION

| | | |
|---|---|---|
| PATENT NO. | : 7,748,037 B2 | Page 1 of 1 |
| APPLICATION NO. | : 11/233733 | |
| DATED | : June 29, 2010 | |
| INVENTOR(S) | : Rajagopal et al. | |

It is certified that error appears in the above-identified patent and that said Letters Patent is hereby corrected as shown below:

In column 14, at line 35 after, -- The -- delete "method".

Signed and Sealed this
Fifth Day of April, 2011

David J. Kappos
*Director of the United States Patent and Trademark Office*